L. THIEL.
SPINDLE LOCKING MECHANISM.
APPLICATION FILED JUNE 3, 1907.

914,527.

Patented Mar. 9, 1909.
2 SHEETS—SHEET 1.

Witnesses
Olivia B. Kaiser
Leo O'Donnell

Inventor
Louis Thiel
By
Wood & Wood
Attorneys

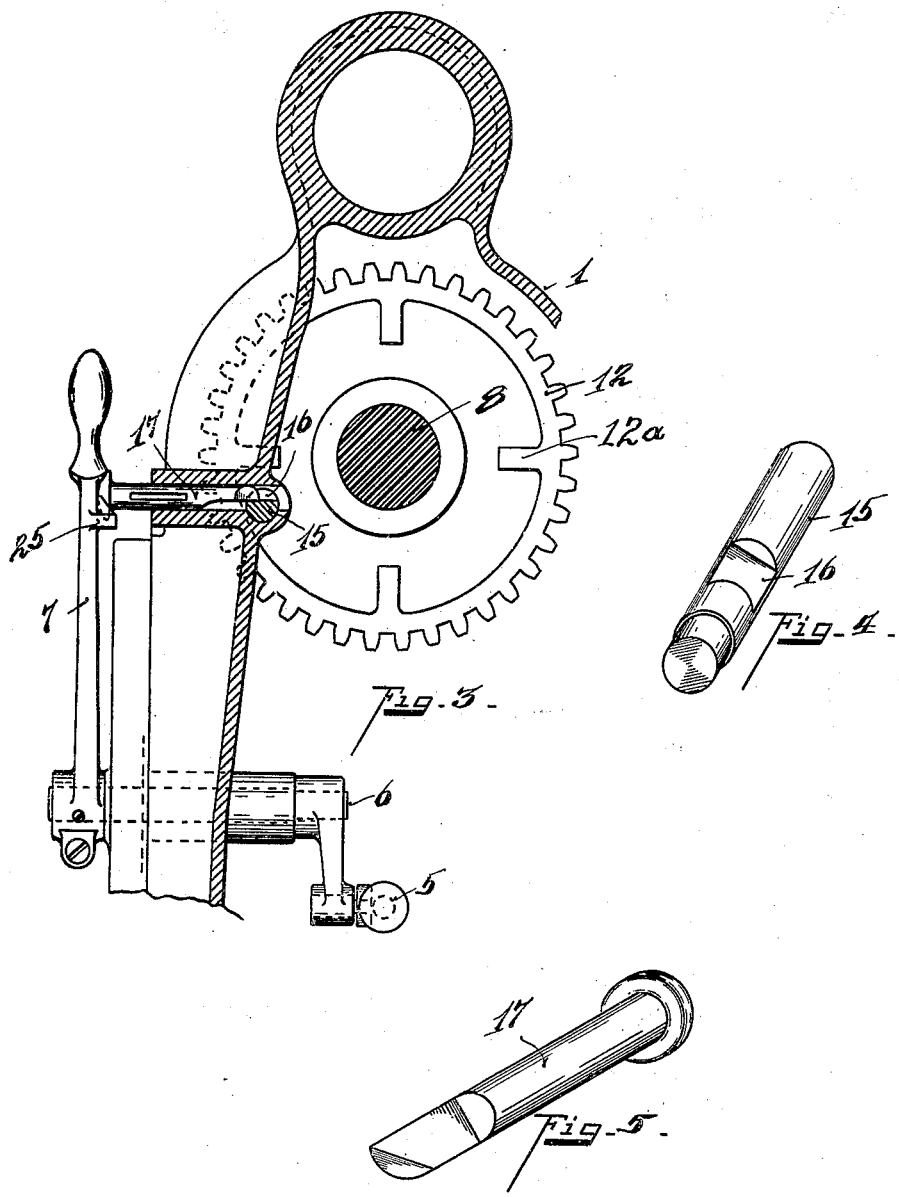

UNITED STATES PATENT OFFICE.

LOUIS THIEL, OF CINCINNATI, OHIO.

SPINDLE-LOCKING MECHANISM.

No. 914,527.  Specification of Letters Patent.  Patented March 9, 1909.

Application filed June 3, 1907.  Serial No. 377,072.

*To all whom it may concern:*

Be it known that I, LOUIS THIEL, a citizen of the United States, residing at Cincinnati, in the county of Hamilton and State of Ohio, have invented certain new and useful Improvements in Spindle-Locking Mechanism, of which the following is a specification.

My invention relates to a spindle locking mechanism.

One of the objects of my invention is to provide means whereby the spindle of a machine can be locked against rotation when the power driving mechanism is at rest for applying and withdrawing various tools to and from the spindle.

Another object of my invention is to provide means whereby the lock is automatically thrown out when the machine is started, and at the same time prevents a locking of the spindle while the machine is in rotation.

The features of the invention are more fully set forth in the description of the accompanying drawings, forming a part of this specification, in which:—

Figure 1:
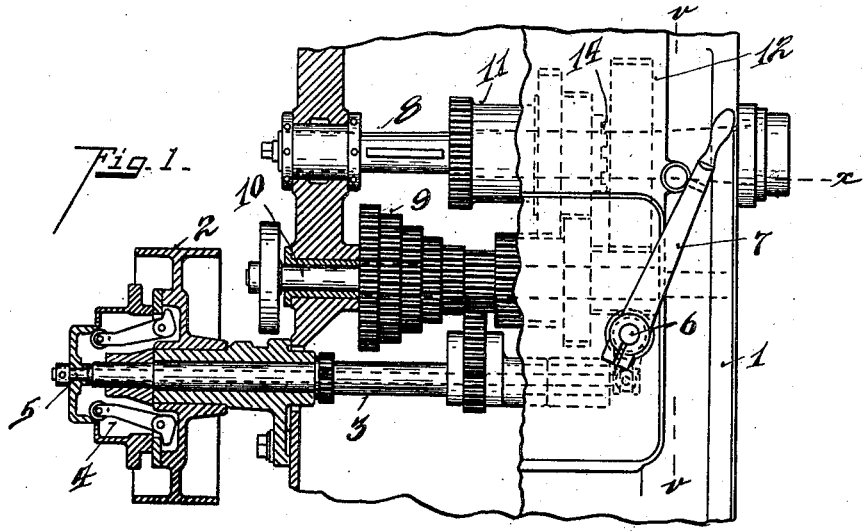
Figure 2:
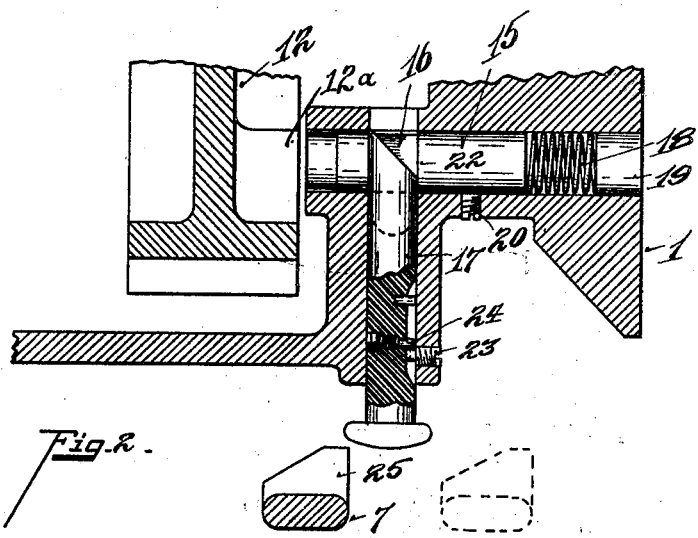

Figure 1 is a side elevation, partly in section, of a portion of a milling machine with my improvement applied. Fig. 2 is an enlarged section on line $x$, Fig. 1. Fig. 3 is an enlarged section on line $v, v$, Fig. 1. Fig. 4 is a perspective view of the lock pin. Fig. 5 is a perspective view of the lock actuating pin.

1 represents the frame of the machine.

2 represents the main driving pulley.

3 represents the driven shaft therefor.

4 represents friction clutch mechanism for controlling the rotation of said shaft 3.

5 represents a rod passing through the shaft 3 and secured at one end to the clutch mechanism of the driving pulley 2, the opposite end is connected by lever mechanism with the stud shaft 6. 7 represents a lever connected to said shaft 6 for actuating the rod 5 for engaging and releasing the friction clutch mechanism.

8 represents the spindle of the machine which it is desired to lock against rotation or movement when the same is at rest.

9 represents a cone of gears upon shaft 10 forming intermediate transmission mechanism for transmitting motion from shaft 3 to the spindle 8.

11 represents a sleeve containing transmission gearing in step form slidably keyed upon the spindle 8.

12 represents a gear loosely mounted, in this instance, upon the spindle and provided with clutch teeth 14, see dotted lines Fig. 1, adapted to engage into clutch teeth formed upon the sleeve 11. Thus it will be seen that when the sleeve 11 is clutched with the gear 12 and said gear 12 is locked, that the spindle 8 is likewise locked. Of course, various arrangements of speed changing transmission gears may be employed between the driving element and spindle, and I therefore do not wish to embody the transmission between the spindle and driving pulley, as shown, as a feature of my invention, the same being employed to show means whereby the lever controlling the drive of the machine is placed in juxtaposition, so that it will be impossible to lock the spindle during its rotation by power.

12$^a$ represents a series of lugs formed on one side face of the gear 12 against which the locking pin engages.

Again, as shown in the drawings, the locking mechanism is brought into engagement with one of the transmitting gears on the spindle, but it is obvious that the spindle may be locked by independent means direct with the spindle to accomplish the same end.

15 represents a lock pin slidably mounted in a bore formed in the frame of the machine, provided with the notch 16, into which the actuating pin 17 passes for moving the lock pin 15 to its released position, shown in Fig. 2.

18 represents a coiled spring, one end of which bears against the lock pin 15, the opposite end against the nut 19.

20 represents a set screw threaded into the frame 1 and projecting into a slot formed in the lock pin 15 to prevent the same from turning, at the same time allowing free sliding action thereof.

The actuating pin 17 at its forward end is cut away, so as to seat within the notch 16, and its end thereof beveled, which beveled edge in the forward movement of the actuating pin 17 strikes against the shoulder 22 formed by the notch 16 of the lock pin 15, thereby causing said lock pin to be moved, and in this instance, to its releasing position.

When the actuating pin 17 is moved outward, the locking pin 15 is automatically brought to its locking position in the path of the lugs 12ª of gear 12, through the tension of the spring 18.

23 represents a set screw, adapted to engage within a groove formed in the actuating pin to prevent the same from turning and forming a stop to limit the outward movement of the actuating pin 17.

24 represents a spring controlled detent seated within the actuating pin 17, preventing the actuating pin from being accidentally, or through the jarring of the machine, thrown outward. In withdrawing the actuating pin 17, or rather, bringing it to its released position, the detent 24 will be moved inward clearing the set screw 23 and permitting a withdrawal of the actuating pin 17 to a point sufficient to release the locking pin 15.

25 represents a boss projecting from the lever 7, adapted to engage the actuating pin 17 when the lever is thrown to its position for starting the driving mechanism, thereby throwing the actuating pin 17 inward automatically and releasing the locking pin 15. Thus it will be seen that it will be impossible to maintain the spindle locked against rotation when the power is thrown on, and the limit of lever movement controlling the drive is such that it will be impossible to withdraw the actuating pin 17 in this position of lever. It is necessary to move the lever to the power cut-off position before the spindle can be locked.

In a machine of this class where the working tools, face plates, chucks, etc., are applied directly upon the spindle it is desired to apply them in position very rigidly. Therefore it is essential to hold the spindle against movement, and also to relieve such strains as are thus imparted upon the spindle in applying and withdrawing the work tools therefrom from the gearing controlling the drive of the spindle. This is accomplished by my improved structure, thereby saving the breakage of teeth of the transmission gearing or otherwise injuring the machine, at the same time affording a lock against which great pressure can be applied in changing the working tools upon the spindle.

Having described my invention, I claim:—

1. A spindle, a lock pin therefor, a pin manipulator, and a lever for controlling the spindle drive, the lever being adapted to block the movement of the manipulator when the power is in and to automatically operate the manipulator in throwing in the power, substantially as described.

2. In a machine of the class described, a main frame, a spindle journaled in said frame, a main drive, a lever for controlling said drive, a lock pin for locking the spindle against rotation, means for manually releasing said lock pin, means for automatically bringing said lock pin into locking engagement after its manual release, and means for automatically disengaging said lock pin when the power controlling lever is brought to its driving position, substantially as described.

3. A spindle, a lock pin therefor, a driving clutch and operating lever, and a pin manipulating member adapted to be moved into the path of the lever for releasing the pin to automatically lock the spindle, whereby the lever in throwing in the clutch automatically withdraws the pin and blocks its return, substantially as described.

4. In a machine of the class described, a frame, a main drive journaled within said frame, means for controlling said drive, a driven member in driven connection with said drive, locking devices for locking said driven member against rotation when said main drive is at rest, means for manually controlling the locking movement of said locking devices, and means for automatically throwing out said locking devices from locking engagement simultaneous with the starting of the main drive, substantially as described.

5. In a machine of the class described, a frame, a spindle journaled within said frame, transmission mechanism fixed to said spindle, means for driving said transmission mechanism, means for controlling said transmission drive, a lock pin slidably mounted within the frame adapted to engage the transmission mechanism upon the spindle in one position while the drive is at rest and moved to a second position for lock release when the drive is thrown into commission, and means for maintaining said lock pin in such released position while the drive is in commission, substantially as described.

6. In a machine of the class described, a main frame, a spindle journaled in said frame, a main drive, a lever for controlling said drive, transmission mechanism between said drive and spindle for imparting rotation to said spindle, lock engaging means fixed to said spindle, a locking pin for engaging said spindle lock engaging means, means for manually bringing said locking pin to a locking position, means for automatically moving said locking pin to a disengaging position simultaneous with the action of the power controlling lever when the latter is brought to a driving position, and means for maintaining the locking pin in such released position while the drive is in commission, substantially as described.

7. In a machine of the class described, a main frame, a spindle journaled in said frame, a main drive, transmission mechanism between said spindle and main drive for imparting rotation to said spindle, a lever for controlling said drive, a lock pin for locking the spindle against rotation, means for manually releasing said lock pin, means for automatically bringing said lock pin into a locking position after its manual release, means for automatically moving said lock pin to a locked disengaged position when the power controlling lever is brought to its driving position, and means for maintaining said lock pin in such disengaged position during the continuance of the spindle drive, substantially as described.

In testimony whereof I have hereunto set my hand.

LOUIS THIEL.

Witnesses:
   OLIVER B. KAISER,
   LEO O'DONNELL.